June 26, 1951     C. R. AUSTIN ET AL     2,558,411
CERAMIC COATING COMPOSITION, COATED
ARTICLE, AND METHOD OF MAKING SAME
Filed May 22, 1945

INVENTORS
Chester R. Austin and
Adrian G. Allison

BY *R.R. Adams*

Agent

Patented June 26, 1951

2,558,411

UNITED STATES PATENT OFFICE 2,558,411

CERAMIC COATING COMPOSITION, COATED ARTICLE, AND METHOD OF MAKING SAME

Chester R. Austin and Adrian G. Allison, Columbus, Ohio, assignors, by mesne assignments, to Battelle Development Corporation, Columbus, Ohio, a corporation of Delaware Application May 22, 1945, Serial No. 595,170

10 Claims. (Cl. 106—63)

This invention relates to ceramic coated backups for welding operations and, more particularly, to metal and fabricated ceramic backups coated with an adherent layer of a finely divided ceramic material.

In the past, metal backup strips have been in general use, especially those made of steel and copper, but all of them are subject to the objection that during the welding operation the metal backup material welds to the weldment and must be chipped loose therefrom. There is less sticking with copper backups than with steel; however, there is still sufficient adherence to cause rapid disintegration of the metal backup bars and to require their replacement. Since copper is relatively expensive and, at the present time, a very critical metal, means for extending the life of the copper backup bars have been widely sought.

The use of fabricated ceramic backups has been proposed to replace copper backup strips, but it has been the experience of the investigators in this field that fabricated ceramics, in general, are highly unsatisfactory as backup materials. At welding temperatures, the fabricated ceramics melt and the slag formed thereby frequently floats up into the weld metal; on the other hand, balls of the weld metal occasionally form in the molten ceramic material.

It is an object of this invention, therefore, to provide ceramic coated backups for welding operations.

Another object of this invention is to provide metal backups coated with a ceramic material so as to prevent sticking of the backups to the weldment and thereby prolong the life of the metal backups.

Still another object of this invention is to provide fabricated ceramic backups coated with a ceramic material which is of such a nature as to prevent gassing and slag inclusions in the weld metal and, at the same time, to prevent the formation of balls of the weld metal in the ceramic backup material.

A further object of this invention is to provide backups for welding operations coated with a ceramic material consisting of wollastonite and a small amount of a bonding agent for insuring adherence of the wollastonite to the backup.

A still further object of this invention is to provide a method of welding which comprises backing up a weld seam with a ceramic-coated backup material.

Another object of this invention is to provide a method of coating backup bars with a ceramic coating.

Figure 1:
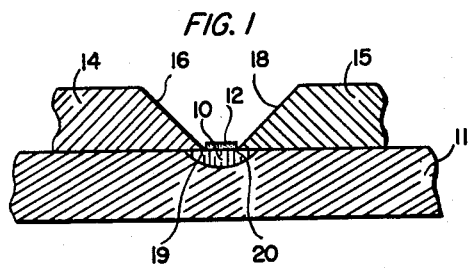
Figure 2:
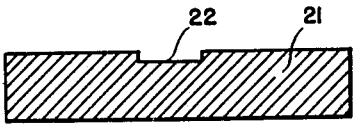
Figure 3:
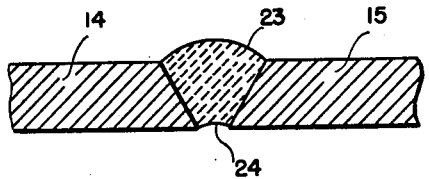
Figure 4:
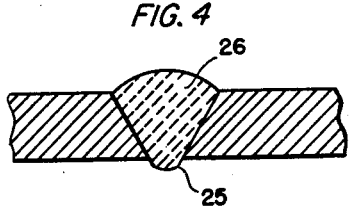
Figure 6:
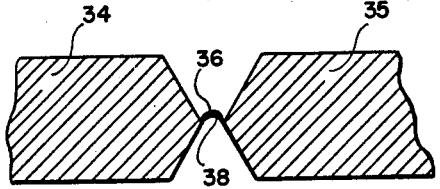
Figure 5:
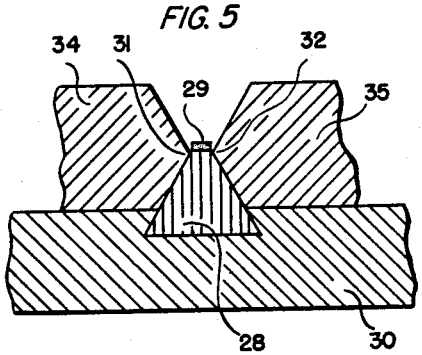
Figure 7:
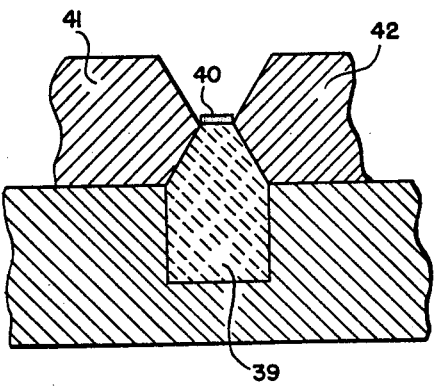

Other objects and advantages of this invention will become apparent from the following detailed description thereof when read in conjunction with the accompanying drawings in which Figure 1 is a cross-sectional view illustrating an assembly for producing a single-V butt weld employing a ceramic-coated flat copper backup, Figure 2 is a cross-sectional view of a grooved copper backup bar, Figure 3 is a cross-sectional view of a single-V butt weld produced from the assembly shown in Figure 1, Figure 4 is a cross-sectional view of a single-V butt weld produced by substituting the grooved copper backup bar shown in Figure 2 in the assembly illustrated in Figure 1, Figure 5 is a cross-sectional view illustrating an assembly for producing a double-V butt weld using a ceramic-coated copper backup bar, Figure 6 is a cross-sectional view illustrating the contour of the weld bead laid down on the root pass in the assembly shown in Figure 5, and Figure 7 is a cross-sectional view illustrating an assembly for producing a double-V butt weld employing a ceramic-coated fabricated ceramic backup.

Ceramic-coated metal backup bars have a much longer period of utility than the uncoated bars, and excellent welds have been produced with ceramic-coated fabricated refractories which, when uncoated, give rise to slag inclusions, gas, etc., so as to produce very unsatisfactory welds. A coating which has proved to be very satisfactory for such purposes comprises, in general, a finely divided ceramic material, a bonding agent for obtaining adherence between the ceramic material and the backup to be coated, and a dispersing agent. Wollastonite; open-hearth finishing and flushing slags having, for example, a composition of approximately 17 to 23% ferrous oxide, 15 to 16.5% silicon dioxide, 42 to 46% calcium oxide, 6.1 to 6.6% magnesium oxide, 6.1 to 6.6% manganese oxide, and 2.0 to 2.2% phosphorus pentoxide; and crushed brick composed of diatomaceous earth have all been found to provide suitable ceramic coatings. Bonding agents, such as clay and sodium silicate, which are noncombustible and which are normally used in the ceramic art may be employed to bond the ceramic material to the backup bar, although certain organic bonding agents, when used in very small amounts, are suitable. Water, of course, is the cheapest and most generally used dispersing agent, but other dispersing agents such as organic diluents may be employed with organic bonding agents.

Based on a dry weight calculation, the ceramic material may vary from about 90% to about 99% and the bonding agent from about 1% to about 10%, although about 95% of the ceramic material and about 5% of the bonding agent is preferred when common binders such as clay and sodium silicate are used. In making general statements as to the composition of the coating material, it is necessary to base these statements on dry weight calculations, because the amount of dispersing agent added to the dry materials depends both on the amount and the type of bonding agent used. The most satisfactory results are obtained with ceramic material of about −100 mesh size, although as fine as −200 mesh size has been found to be practical.

The following composition which includes open-hearth finishing slag material has proven satisfactory:

| | Percent by weight |
|---|---|
| Open-hearth finishing slag | 69.0 |
| Sodium silicate | 2.7 |
| Water | 28.3 |
| | 100.0 |

The slag material was ground through rolls to pass a 100-mesh sieve and then mixed with the sodium silicate. Water was added slowly with constant stirring to the slag-silicate mixture to produce a thin homogeneous wash. A similar wash was compounded in like manner from the following ingredients:

| | Percent by weight |
|---|---|
| Open-hearth flushing slag | 71.4 |
| Sodium silicate | 2.4 |
| Water | 25.9 |
| | 100.0 |

Crushed diatomaceous brick was incorporated in a composition of the following character:

| | Percent by weight |
|---|---|
| Crushed diatomaceous earth brick | 41.7 |
| Sodium silicate | 2.7 |
| Water | 55.6 |
| | 100.0 |

Wollastonite apparently has properties which especially adapt it to the purposes of this invention. It is readily available in a finely divided state, requires very small amounts of bonding agent to cause it to adhere to the backup bar, releases little or no gas during the welding operation, and its presence prevents adherence of the metal bar to the weldment as well as forming a parting compound between the fabricated ceramic material and the weldment. The following compounds employing wollastonite as the ceramic material have proved very satisfactory and constitute the preferred coating material:

*Wollastonite "A"*

| | Percent by weight |
|---|---|
| Wollastonite | 56.8 |
| Dry powdered clay | 3.4 |
| Water | 39.8 |
| | 100.0 |

*Wollastonite "B"*

| | Percent by weight |
|---|---|
| Wollastonite | 64.9 |
| Sodium silicate | 2.7 |
| Water | 32.4 |
| | 100.0 |

Although backups coated with washes containing wollastonite of −200 mesh size are satisfactory, the preferable size for wollastonite has been found to be −100 +150 mesh. Both of these coating compounds or washes are prepared by mixing the ceramic material with the bonding agent and then slowly adding the water. The clay bonding agent, because of its colloidal nature, is advantageous in this respect over sodium silicate, since it tends to stabilize the wash which, therefore, does not settle as fast as washes employing sodium silicate as a bonding agent.

The ceramic coating may be applied to the backup bars while they are held at an angle of about 45 degrees in order to facilitate draining. Rotating the bars occasionally helps to produce a more even coating thereon. The entire bar may be coated with the wash and allowed to drain, or a single face of the bar may be coated by brushing it with the wash before the bar is in place as respects the weldment for welding, or after the bar is in place by the use of an oil can or the like. Instead of permitting the ceramic coating to dry on the entire bar, all of the coating material on the bar, except for the surface which is to contact the weld metal, may be wiped off. The coating is then heated in order to dry it. The particular manner in which the backup bars are coated with the ceramic wash does not form part of this invention and many variations in addition to those above described may be employed.

Using the wash designated Wollastonite "A," the coating is applied to the backup bar so as to obtain a thickness giving a dry weight of between 0.3 to 0.4 gram per square inch; whereas, with Wollastonite "B" it is desirable to obtain a thickness of about 0.3 to about 0.5 gram per square inch. When the coating is too thick, the weld is difficult to control and shows a tendency to gas. When the ceramic coating is too thin, both the weld and the backup strip are more difficult to clean and sticking occasionally occurs. In general, the thickness of the coating will vary from about 0.1 gram per square inch to about 0.6 gram per square inch.

Methods of welding employing ceramic coated backup bars do not differ materially from those generally employed with metal backups, as illustrated by the accompanying drawings. In Figure 1, a flat metal backup bar 10, which in this particular illustration will be called a copper bar, is positioned in a support 11 in the usual manner. A ceramic coating material 12 has been removed from all of the faces of the bar 10 except the face coming in contact with the weld metal. The weldment comprises metal plates 14 and 15 having beveled scarfs 16 and 18, respectively. The root edges 19 and 20 of the steel plates 14 and 15, respectively, are so positioned with respect to one another as to form a welding seam having a root gap completely spanned by the ceramic coating material 12. In place of the flat bar 10, a copper backup bar 21 having a groove 22 formed therein may be used as shown in Figure 2. In Figure 3 the bottom of the weld metal 23 has a concave contour due to the fact that a certain amount of space is filled by the ceramic coating 12. The single-V butt weld shown in Figure 4 which was made using a grooved backup bar, such as that shown in Figure 2, has a convex surface 25 on the bottom of the weld metal 26, because the groove 22 of the bar 21 provided more than ample space to take care of the coating material 12. It is obvious that a weld, such as that shown in Figure 4, has greater strength than the weld illustrated on Figure 3 due to the fact that the weld metal 26 more completely fills the space comprising the weld seam between the plates 14 and 15.

Although the present invention is more widely applicable to single-V welds than to double-V welds, it may be employed in the latter capacity as illustrated in Figures 5, 6, and 7. In Figure 5, a copper backup bar 28, having a triangular shape and a ceramic coating 29 on the outer surface thereof, is positioned in the usual manner in a support 30 so as to place the top of the ceramic coating 29 even with or just slightly above the root edges 31 and 32 of plates 34 and 35, respectively. The reason for thus positioning the backup bar 28 is apparent in Figure 6, which discloses the contour of the weld after the root pass has been made. It will be noted that the root bead 36 has a concave lower surface 38 due to the fact that the root edges 31 and 32 have melted away slightly and also that the space in between these root edges has been partially filled by the ceramic coating material 29. In producing double-V butt welds it is highly desirable to have a concave contour on the lower portion of the first bead, since the second bead, which is usually deposited on the opposite side or bottom side of the root bead, will weld more solidly thereto if the toes of the root bead are open, that is, obtuse in contour rather than acute, due to the difficulty of forcing the weld metal forming the second bead down into a narrow V-shaped void.

Double-V butt welds may be made by using a fabricated ceramic bar 39 set in a support 43, as shown in Figure 7, having on the surface coming in contact with the weld metal a thin coating of ceramic material 40. The weldment, comprising plates 41 and 42, is positioned in much the same relationship with the bar 39 as is the weldment in Figure 5 with the bar 28.

It is to be understood that the accompanying drawings and the above description thereof are given by way of illustration and not of limitation.

From the above description, it is apparent that the present invention comprises solid backup members coated with a ceramic coating material which is of such a character as to act as a parting compound between the backup bar and the weldment. When the present invention is employed in connection with metal backup bars, the life of the bars is greatly extended. The use of the present invention in connection with ceramic brick backups permits successful welding over such materials which, without the ceramic coatings, could not be employed.

Variations and modifications of the invention herein above set forth will become apparent to those skilled in the art, and such changes as may be made without departing from the spirit of the invention as defined in the appended claims are to be included as part of this invention. For example, the ceramic coatings herein-above described may be used to coat granular ceramic backup materials. One such satisfactory backup material was produced by coating calcined kyanite of —10+20 mesh size with the Wollastonite "A" coating. Good welds were produced which were easy to clean.

All percentages indicated in the above specification and the attached claims refer to weight and not to volume.

What is claimed is:

1. A backup for welding operations comprising a metal bar which has been coated to the extent of about 0.4 gram per square inch with a wash composed essentially of about 65% wollastonite of about —100 mesh size, about 3% sodium silicate, and about 32% water.

2. A method of coating backup bars for welding operations, which comprises applying to a backup bar a wash comprising wollastonite, an inorganic bonding agent selected from the group consisting of clay and sodium silicate for obtaining adherence of the wollastonite to the backup bar, and a dispersing medium for the wollastonite and bonding agent, said wollastonite and said bonding agent being present in a quantity sufficient to provide a dry coating comprising from 90 to 99 per cent wollastonite, and the balance bonding agent, said wollastonite being of a particle size not greater than —100 mesh size, draining the excess wash from the backup bar so as to leave a coating of a thickness of from 0.1 gram per square inch to 0.6 gram per square inch thereon when dried, and heating the coating in order to dry it.

3. The method set forth in claim 2, wherein the bonding agent is sodium silicate.

4. The method set forth in claim 2, wherein the bonding agent is clay.

5. The structure set forth in claim 7, wherein the bonding agent is sodium silicate.

6. The structure set forth in claim 7, wherein the bonding agent is clay.

7. A backup for welding operations coated with a coating having a composition of from 90 to 99 per cent wollastonite of a particle size not greater than —100 mesh size and from 1 to 10 per cent inorganic bonding agent selected from the group consisting of clay and sodium silicate, said coating varying in thickness from 0.1 gram per square inch to 0.6 gram per square inch.

8. A coating material for a backup for welding operations, said coating material comprising wollastonite, an inorganic bonding agent selected from the group consisting of clay and sodium silicate for obtaining adherence of the wollastonite to the backup bar, and a dispersing medium for the wollastonite and bonding agent, said wollastonite and said bonding agent being present in a quantity sufficient to provide a dry coating comprising from 90 to 99 per cent wollastonite, and the balance bonding agent, said wollastonite being of a particle size not greater than —100 mesh size.

9. The material set forth in claim 8, wherein bonding agent is sodium silicate.

10. The material set forth in claim 8, wherein the bonding agent is clay.

CHESTER R. AUSTIN.
ADRIAN G. ALLISON.

(References on following page)

REFERENCES CITED

The following references are of record in the file of this patent:

UNITED STATES PATENTS

| Number | Name | Date |
|---|---|---|
| 938,688 | Nichols | Nov. 2, 1909 |
| 1,230,958 | Warga | June 26, 1917 |
| 1,453,593 | Meloche | May 1, 1923 |
| 1,764,544 | Baumgardner | June 17, 1930 |
| 1,817,245 | Freed | Aug. 4, 1931 |
| 1,955,156 | Udale | Apr. 17, 1934 |
| 1,990,075 | Horak | Feb. 5, 1935 |
| 2,173,109 | Hamblin | Sept. 19, 1939 |
| 2,215,295 | Morrill | Sept. 17, 1940 |
| 2,340,680 | Oswald et al. | Feb. 1, 1944 |
| 2,364,436 | Frisch | Dec. 5, 1944 |
| 2,426,445 | Frisch | Aug. 26, 1947 |